United States Patent

[11] 3,634,792

[72] Inventors Robert W. Blomenkamp
Palo Alto, Calif.;
Enrique J. Klein, 947 Alice Ln., Menlo Park, Calif. 94025
[21] Appl. No. 763,665
[22] Filed Sept. 30, 1968
[45] Patented Jan. 11, 1972
[73] Assignee said Klein, by said Blomenkamp

[54] SYSTEM FOR AUTOMATICALLY SENSING AND INDICATING THE ACCELERATION AND DECELERATION OF A VEHICLE
19 Claims, 24 Drawing Figs.
[52] U.S. Cl............................................. 340/52, 315/79, 324/70, 340/62, 340/262
[51] Int. Cl............................................. G08b 21/00
[50] Field of Search............................................. 340/262, 263, 271; 324/70, 162

[56] References Cited
UNITED STATES PATENTS
2,769,949 11/1956 Stratton.................. 340/263
2,900,465 8/1959 Weiss.................... 340/262
3,188,620 6/1965 MacCallum.............. 340/271
3,364,384 1/1968 Dankert................. 340/262
3,455,148 7/1969 Foster et al............. 340/262
2,190,682 2/1940 Satterlee................ 340/271
2,920,156 1/1960 Rice et al................ 340/70
3,320,586 5/1967 Wagner.................. 340/52

Primary Examiner—John W. Caldwell
Assistant Examiner—Howard S. Cohen
Attorney—Enrique J. Klein ABSTRACT: Apparatus for the determination of the acceleration and deceleration of a vehicle in which an electromechanical sensing device generates an output signal in response to the rotation of shaft turning at a fixed ratio to the vehicle drive shaft. Electronic circuitry processes the signal of the sensing device for continuous monitoring of acceleration and deceleration on a meter, and for operating light signals indicating levels of acceleration and deceleration in a system that is integrated with conventional brake and backup light systems.

PATENTED JAN 11 1972

INVENTORS
E. J. KLEIN AND R.W. BLOMENKAMP

*J. Rosenblum*
ATTORNEY

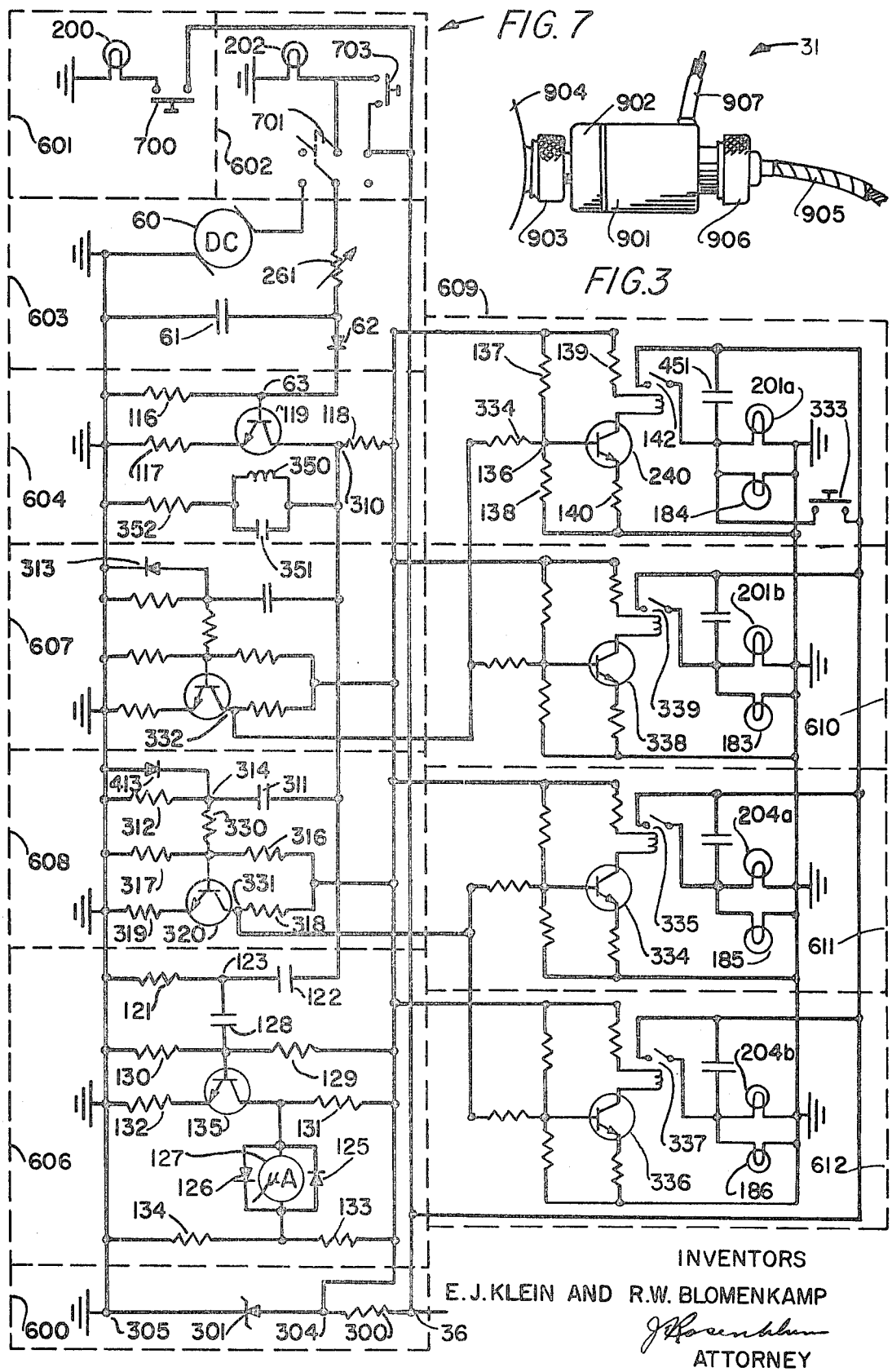

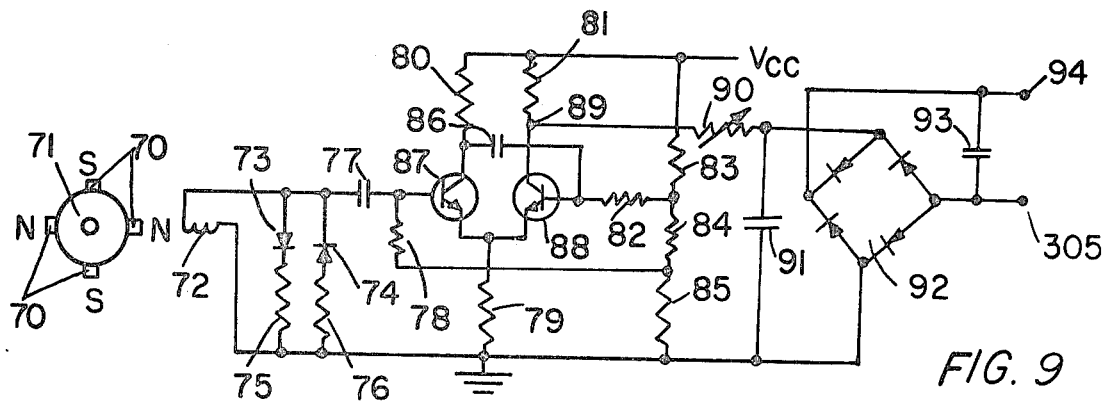
FIG. 9
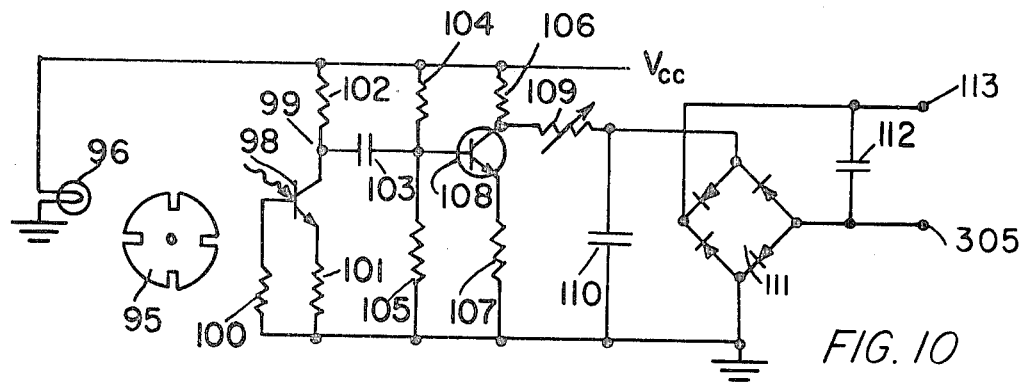
FIG. 10
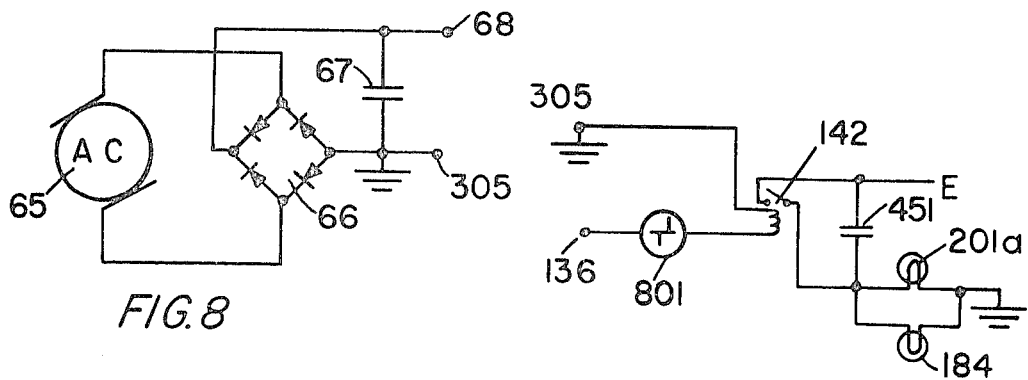
FIG. 8
FIG. 11
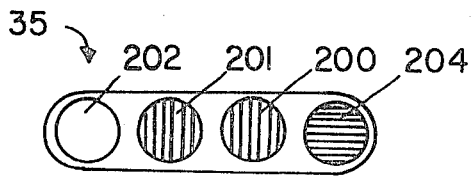
FIG. 6
INVENTORS
E. J. KLEIN AND R. W. BLOMENKAMP
*J. Rosenblum*
ATTORNEY

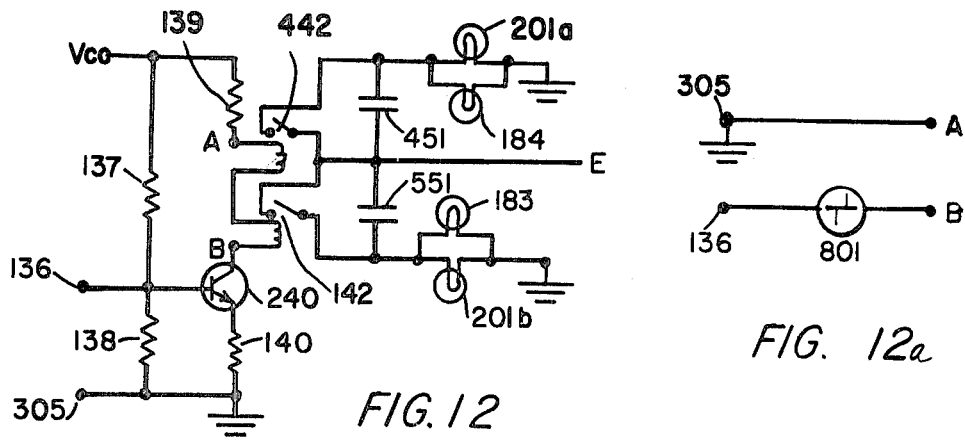
FIG. 12
FIG. 12a
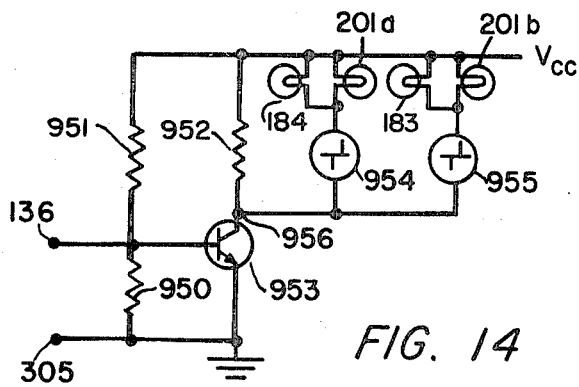
FIG. 14
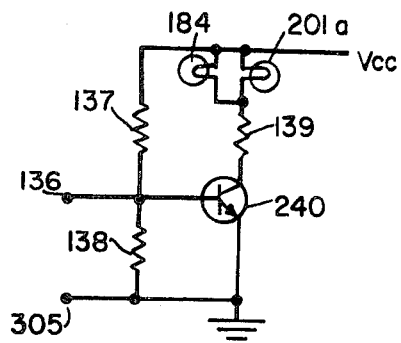
FIG. 13
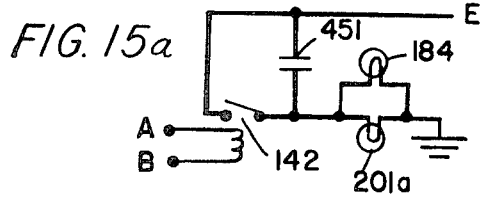
FIG. 15a
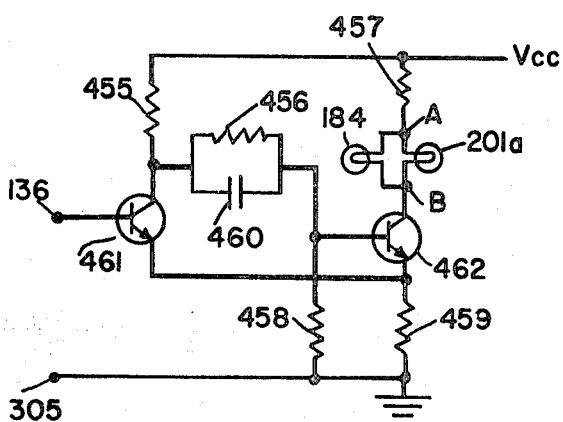
FIG. 15
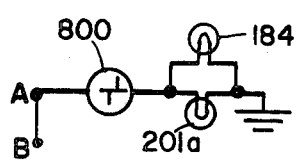
FIG. 15b
INVENTORS
E. J. KLEIN AND R. W. BLOMENKAMP
ATTORNEY

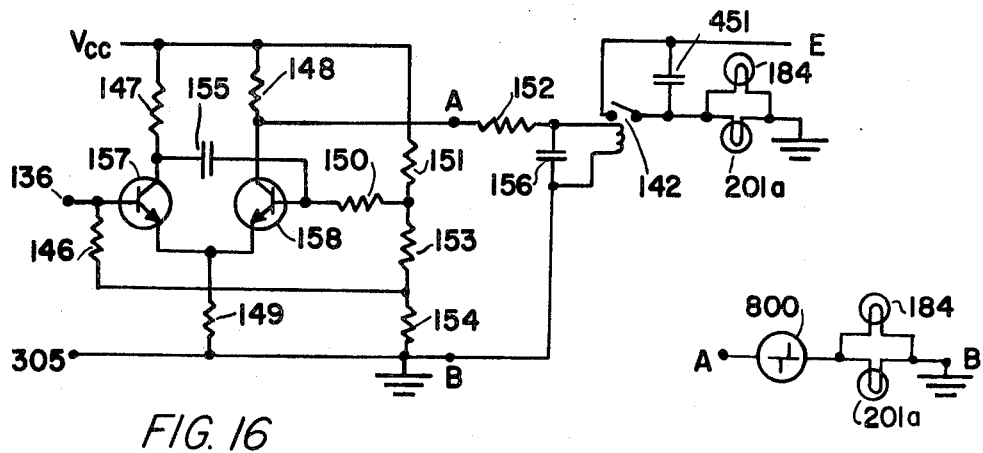
FIG. 16
FIG. 16a
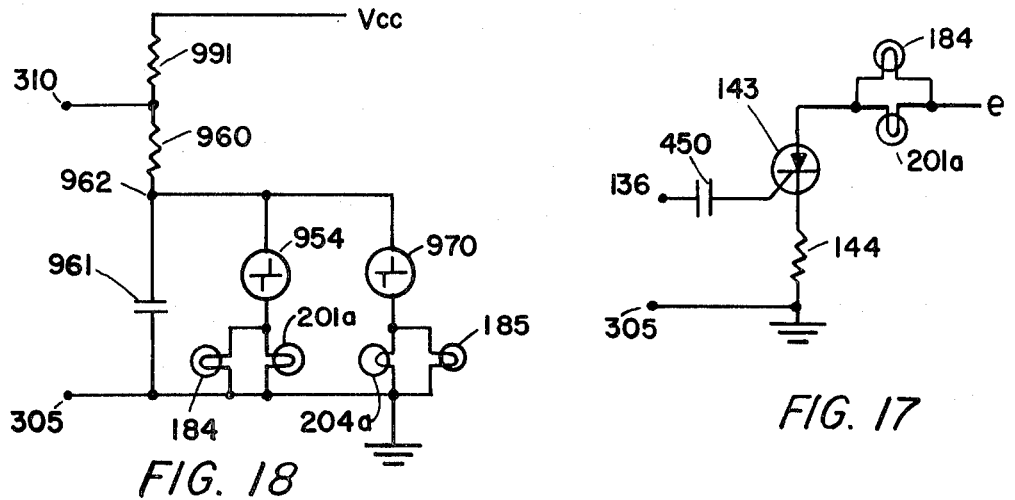
FIG. 18
FIG. 17
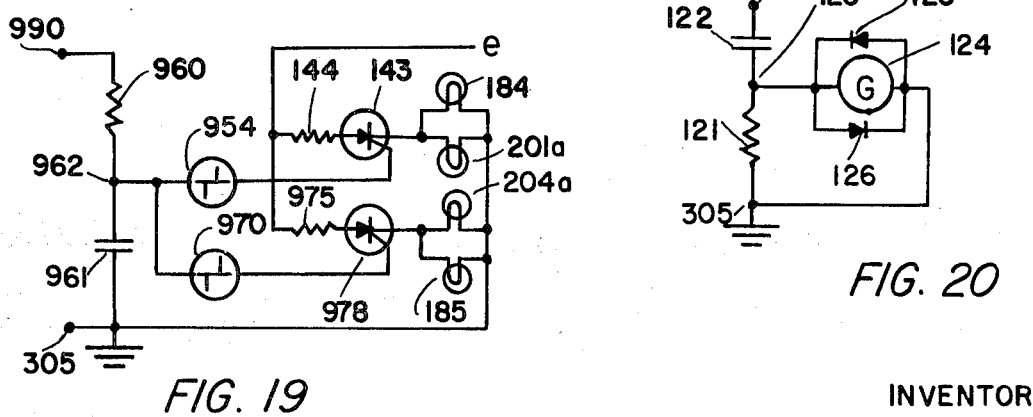
FIG. 19
FIG. 20
INVENTORS
E. J. KLEIN AND R.W. BLOMENKAMP
ATTORNEY

SYSTEM FOR AUTOMATICALLY SENSING AND INDICATING THE ACCELERATION AND DECELERATION OF A VEHICLE

The present invention relates to improvements in means for signalling from one motorized vehicle to its followers when it is accelerating or when it is decelerating independently of the actuation of the accelerator or the use of the vehcile's brakes.

If one motorized vehicle follows closely behind the other in dense traffic, the driver of the following vehicle responds to perceived changes in the speed of the leading vehicle and attempts to keep the speed difference between his and the leading vehicle at a minimum so as to follow in a safe and stable manner. The following driver's response mechanism, which terminates in his actuation of the brake or the accelerator will be set in action by his perception of external stimuli. Drivers will vary in experience and state of alertness and, therefore, the obviousness of the external stimuli will determine whether it is perceived and also affect the reaction time. Normally, to appraise a change in velocity of the leading vehicle, a following driver must presently rely only on: (a) the range-finger capabilities of his eyes, and (b) stoplights, if the driver of the leading vehicle applies the brakes.

The deceleration of a vehicle when coasting is mainly due to the retarding effect of the internal combustion engine compression and to the aerodynamic drag of the body of the vehicle. The magnitude of this deceleration is higher for vehicles with powerful, high compression internal combustion engines and for very light vehicles. Deceleration due to engine compression and aerodynamic drag is particularly high at the higher speeds where, for example, a value of −3 m.p.h./sec. at 70 m.p.h. is not uncommon. This indicates that in a short period of time a vehicle can decelerate significantly without giving any warning signal to the following driver, other than an increase in smoke from the exhaust when the accelerator pedal is released, which is not easy to detect and remains unobserved by many drivers.

It is clear that is a signal of a vehicle's deceleration, independently of any use of the brakes, were given to the following driver, this driver would in many cases gain sufficient time to respond effectively and avoid a possible rear end collision. The danger of such situations is magnified in fast traffic with closely following vehicles, as encountered in our modern freeways, or when driving on icy roads where abrupt decelerating through brake action may not even be desirable.

This traffic safety hazard was recognized at least 20 years ago, and although a number of devices have since been proposed to provide the necessary sensing and signalling, none of them have gained widespread acceptance. One reason for the failure of the previous art is that systems based on the operation of the accelerator pedal are not practical because its position or motion does not give a true indication of the acceleration and deceleration of the vehicle. For example, a car with a weak engine may actually decelerate on a steep upgrade while the accelerator pedal is being depressed further, and the high frequency rate of its depress-release cycle under heavy traffic conditions would provide a confusing number of signals to a following driver.

An object of the present invention is to provide improved systems for sensing the acceleration and deceleration of a vehicle.

Another object of this invention is to visually display the magnitude of acceleration or deceleration to the vehicle driver and to signal acceleration or deceleration conditions to a following vehicle driver.

Another object of this invention is to provide fully automatic acceleration and deceleration sensing and signalling systems which require no attention from the vehicle driver.

Yet another object of this invention is to provide deceleration sensing and signalling systems which in their simplest forms can be adapted to existing vehicles without major modifications to the vehicle.

Still further objects and advantages will appear in the more detailed descriptions given below. Preferred forms of the present invention are shown in the accompanying drawings wherein:

FIG. 3 is an elevational view of an electrical sensor and a mechanical switching device mounted to be driven by the transmission of a vehicle, for use in the system of FIG. 2;

FIG. 6 is an elevational view of a composite taillight assembly for a vehicle, for use in the system of FIG. 2;

FIG. 7 is a schematic diagram of sensing, signal processing and indicating circuits, for use in the system of FIG. 2;

FIG. 8 is a schematic diagram of a sensor and signal conditioner module using an AC generator, for use in a modification of FIG. 7;

FIG. 9 is a schematic diagram of a sensor and signal conditioner module using a magnetic rotor, for use in a modification of FIG. 7;

FIG. 10 is a schematic diagram of a sensor and signal conditioner module using a light beam interrupting device, for use in a modification of FIG. 7;

FIG. 11 is a schematic representation of a level sensor and switching module using a glass semiconductor threshold switch and a relay, for use in a modification of FIG. 7;

FIG. 12 is a schematic diagram of a level sensor and switching module using a transistor and two relays, for use in a modification of FIG. 7;

FIG. 12a is a schematic diagram of a modification of FIG. 12 using a glass semiconductor threshold switch;

FIG. 13 is a schematic diagram of a level sensor and switching module using a power transistor, for use in a modification of FIG. 7;

FIG. 14 is a schematic diagram of a level sensor and switching module using a power transistor and two glass semiconductor threshold switches, for use in a modification of FIG. 7;

FIG. 15 is a schematic diagram of a level sensor and switching module incorporating a trigger circuit using a power transistor, for use in a modification of FIG. 7;

FIG. 15a is a schematic diagram of a modification of FIG. 15 using a relay;

FIG. 15b is a schematic diagram of a modification of FIG. 15 using a glass semiconductor threshold switch;

FIG. 16 is a schematic diagram of a level sensor and switching module incorporating a monostable multivibrator circuit, for use in a modification of FIG. 7;

FIG. 16a is a schematic diagram of a modification of FIG. 16 using a glass semiconductor threshold switch;

FIG. 17 is a schematic diagram of a level sensor and switching module using a silicon controlled rectifier, for use in a modification of FIG. 7;

FIG. 18 is a schematic diagram of a differentiator, level sensor, and switching circuit incorporating glass semiconductor threshold switches, for use in a modification of FIG. 7;

FIG. 19 is a schematic diagram of a differentiator, level sensor, and switching circuit incorporating glass semiconductor threshold switches and SCR's, for use in a modification of FIG. 7; and FIG. 20 is a schematic diagram of a differentiator and indicator module incorporating a galvanometer, for use in a modification of FIG. 7.

Figure 1:
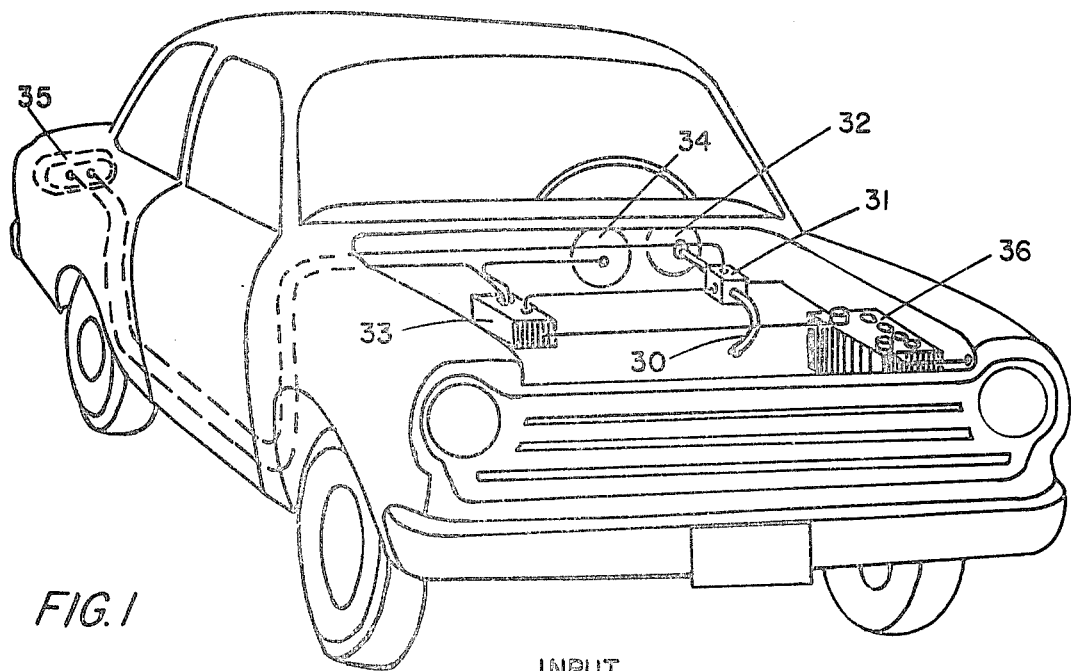
FIG. 1 is a perspective view of an automobile having the components of the sensing and signalling system of the present invention installed therein.
Figure 2:
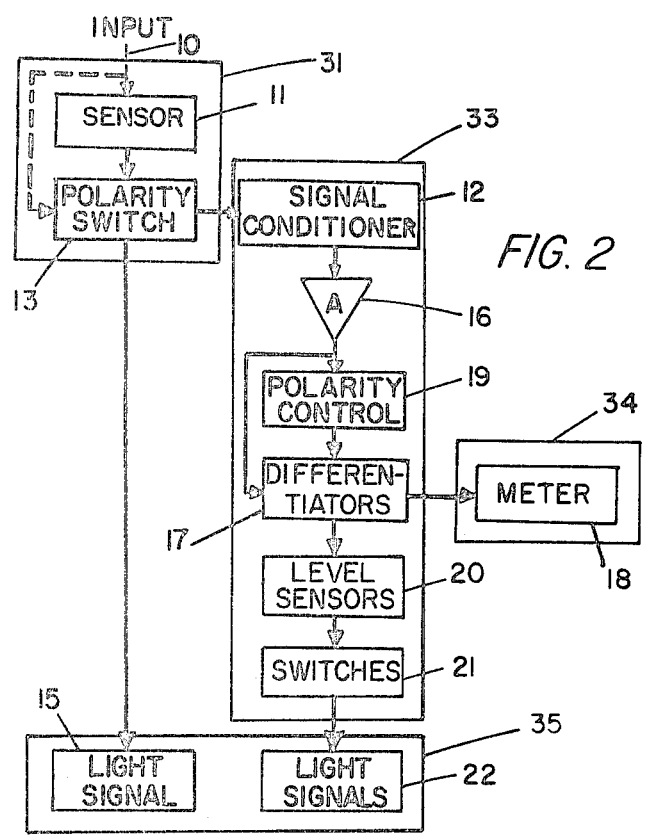
FIG. 2 is a block diagram of a complete sensing, DC signal processing and indicating system in accordance with the present invention.

Reference is now made to the drawings of FIG. 1 and FIG. 2 for the description of the principal parts of this invention and their functions. Reference is made later to the drawings of FIGS. 3 to 7 detailed descriptions of the components of one preferred embodiment of the invention. FIGS. 8 to 20 are referred to in connection with the description of modifications to said preferred embodiment.

The automobile in FIG. 1 has its hood removed and shows schematically the principal components and component blocks of the present invention. The input signal is provided by a speedometer cable 30 which drives both a sensor inside an enclosure 31, as well as the automobile speedometer 32. Enclosure 31 is shown close to the speedometer 32 for convenience of illustration only; a more suitable location would be at the speedometer cable takeoff at the transmission of the vehicle (see FIG. 3). The electrical signal from the sensor in enclosure 31 is then carried to an enclosure 33 which contains electronic processing means. The electrical output of the circuitry in enclosure 33 consists of a signal corresponding to the acceleration or deceleration of the vehicle which is visually indicated on a meter assembly 34. The electronic circuitry in enclosure 33 also operates switches at discrete levels of acceleration and deceleration of the vehicle, which then activate light signals incorporated in fixtures, such as fixture 35, at the rear of the automobile.

A switching device sensitive to the forward or reverse motion of the automobile is also contained in the enclosure 31. This switching device activates the backup light signals of the vehicle also installed in fixtures, such as fixture 35, at the rear of the automobile. The DC power supply required for the operation of the electronic processing circuitry in enclosure 33, and of the light signals such as those in fixture 35, is provided by an automobile battery 36 and its generator.

In the block diagram of FIG. 2, the components of this invention are subdivided in terms of their functions and their interdependence is shown. The devices shown schematically in FIG. 1 are identified in FIG. 2 by rectangular blocks carrying the same numeration. Enclosure 31 contains a sensor 11 and polarity switch 13; enclosure 33 contains a signal conditioner 12, an amplifier 16, a polarity control 19, differentiators 17, level sensors 20, and switches 21; enclosure 21; enclosure 34 contains a meter or other readout device 18; and fixture 35 incorporates light signals 15 and 22 activated from the polarity switch in enclosure 31 and the signal processing circuitry in enclosure 33, respectively.

The mechanical input 10, to the sensor in enclosure 31, is the rotation of the drive shaft to the wheels of the vehicle or the rotation of any other shaft turning at a fixed ratio to the drive shaft. Thus the change in angular velocity of this shaft will accurately reflect the acceleration and deceleration of the vehicle, except when the driving wheels are slipping or spinning on the ground. This mechanical input then drives the sensor 11 which produces an electrical signal directly related to the mechanical input 10. The polarity switch 13 is governed by the mechanical input 10. It works like a double-pole double-throw switch disconnecting the electrical signal of the sensor 11 from the electronic signal processing circuitry and switching on the backup signal light 15 when input 10 corresponds to a reverse motion of the vehicle. During forward motion of the vehicle the switch 13 connects the signal of the sensor 11 to the electronic signal processing circuitry and switches off the backup signal light 15.

The signal generated by the sensor 11 is electronically modified in the signal conditioner 12 to provide a suitable input to the rest of the signal processing circuitry. It then passes through the amplifier 16 which provides it with sufficient gain to drive the differentiator circuits 17. The output from the amplifier 16 still corresponds to input 10 and a differentiated signal would be proportional to the first time derivative of that input. Therefore, since input 10 represents the angular velocity of a shaft corresponding to the velocity of the vehicle, a differentiated signal would correspond to the angular acceleration or deceleration of that shaft, or the acceleration or deceleration of the vehicle. Such a signal is obtained from one of the differentiator circuits in block 17, using the input that bypasses the polarity control 19, and is then directly monitored by the meter 18 which may, for example, give a continuous visual indication of the vehicle's acceleration or deceleration to the vehicle operator. The polarity control 19 causes signals increasing with time corresponding to vehicle acceleration, and signals decreasing with time corresponding to vehicle deceleration, to be processed, respectively, by separate differentiator circuits in block 17 and then applied to separate groups of level sensing circuits in block 20. These in turn operate separate switches in block 21 which energize the light signals in block 22. When the acceleration or deceleration of the vehicle reaches a predetermined magnitude, the appropriate level sensor circuit switches on its corresponding light signal this providing an indication of a given level of acceleration or deceleration.

The principal parts of this invention have thus been described in connection with FIG. 1, and the functions of these parts have been described in connection with FIG. 2. A detailed description is given next of the components for one preferred embodiment of this invention.

In FIG. 3, the electrical sensor 901 corresponds to the sensor in block 11 of FIG. 2, and the mechanical switching device 902 corresponds to the polarity switch in block 13 of FIG. 2. Devices 901 and 902 can be fabricated to form one assembly 31 which can then be attached at one end, by means of a nut 903, to the transmission housing 904 of the vehicle, while at the other end, the speedometer cable 905 can be attached to the assembly by means of nut 906. The electrical sensor 901 and the mechanical switching device 902 are preferably mounted on a common shaft which is then directly coupled to the speedometer cable takeoff at the transmission and to the speedometer cable itself. Electrical conductors corresponding to both the sensor and the switching device are represented by 907.

Figure 4:
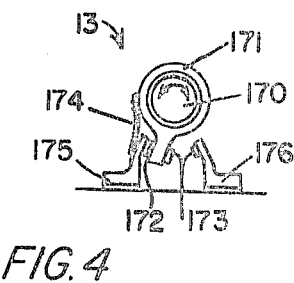
FIG. 4 is a transverse sectional view of a mechanical switching device, responsive to sense of rotation, for use in the system of FIG. 2.

A mechanical switching device responsive to sense of rotation, shown in FIG. 4, corresponds to the polarity switch in block 13 shown schematically in FIG. 2. In FIG. 4, a shaft 170 turning at a fixed ratio to the drive shaft to the vehicle wheels has a slip ring arrangement 171 in which the shaft 170 can rotate freely. The slip ring 171 is restricted to a fixed position in the direction of the shaft axis. The slip ring 171 has a projection carrying two electrically insulated poles, each belonging to one of two sets of electrical contacts 172 and 173. A pair of fixed pole supports 175 and 176, which carry the other two electrically insulated poles of the two sets of contacts 172 and 173, also act as stops restricting the rotation of the slip ring 171 to a small angle. A spring 174 provides a biasing force to maintain the contact set 172 closed in preference over the contact set 173. When the shaft 170 rotates in the direction corresponding to the forward motion of the vehicle, i.e., clockwise in FIG. 4, the frictional drag between the shaft 170 and the slip ring 171 (transmitted by a viscous oil or grease) and the force exerted by the spring 174, both act to produce the closure of the contact set 172. When the shaft rotates counterclockwise, corresponding to a reverse motion of the vehicle, the frictional drag between the shaft 170 and the slip ring 171, overcomes the force of the spring 174 and produces the closure of the contact set 173 and the opening of the contact set 172. When the shaft does not rotate, the force exerted by the spring 174 maintains the contact set 172 closed and the contact set 173 open. The contact set 172 opens and closes a contact carrying the output signal from the sensor 11 to the signal processing circuit 33 as shown in FIG. 2. The contact set 173 opens and closes a contact to the backup light signal 15 as shown in FIG. 2.

Figure 5:
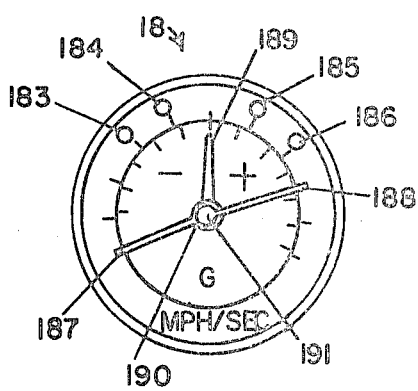
FIG. 5 is an elevational view of a meter which visually displays the magnitude of acceleration and deceleration of a vehicle, for use in the system of FIG. 2.

A meter to visually and quantitatively display the magnitude of acceleration and deceleration, shown in FIG. 5, corresponds to the meter in block 18 shown schematically in FIG. 2. The meter in FIG. 5, indicates acceleration and deceleration of a vehicle in forward motion both in fractions of the acceleration due to gravity (g.), and in miles per hour per second (m.p.h./sec.) The meter can be a zero center galvanometer or a biased microammeter. Four miniature lamps, 183, 184, 185 and 186 are positioned on the meter scaleplate next to the magnitudes of acceleration at which they are set to light up. The lamps 183 and 184 indicate two levels of deceleration and the lamps 185 and 186 indicate two levels of acceleration. Each lamp operates when the vehicle reaches the specified acceleration or deceleration and shows the same colors as the corresponding taillights. Mechanical resetting pointers 187 and 188 are used to provide a record of both maximum deceleration and maximum acceleration. Pointers 187 and 188 are free to move except for a slight frictional drag which keeps them normally stationary. When the meter indicating needle 189 moves, it can push one of the pointers up to its maximum reading, where it remains when the needle 189 backs off. Pointers 187 and 188 can be reset or moved out of the way manually by two independent knobs 190 and 191.

A composite taillight assembly, shown in FIG. 6, corresponds to the fixture in block 35 shown schematically in FIG. 2. In FIG. 6, four light signals are mounted in one compartmental assembly. The light signal mount 200 comprises a red lens and a single filament lamp used as a conventional running taillight. The light signal mount 201 comprises preferably a red lens and a double filament lamp. The first filament is connected to a conventional brake actuated switch in parallel with a switch operating at the first threshold level of deceleration, and the second filament becomes energized at a second threshold level of deceleration, greater than the first. The light signal mount 202 comprises a colorless lens and a single filament lamp which is turned on when the vehicle goes into reverse motion. The light signal mount 204 comprises a preferably blue lens, and a double filament lamp in which each of the filaments becomes energized at a different threshold level of acceleration.

The schematic representation in FIG. 7 is a preferred embodiment of a sensing, signal processing and indicating system in accordance with the present invention. In FIG. 7, circuitry and components enclosed by a broken line frame perform one or more functions corresponding to those of the more general block diagram of FIG. 2. Each one of these blocks can be considered as an interchangeable module. Alternative modules are disclosed later in this specification, following the complete description of this preferred embodiment and an example of a simplified version of this embodiment.

In FIG. 7, block 600 contains a resistor 300 and a zener diode 301 which provide a constant DC supply voltage $V_{CC}$ between terminals 304 and 305 for the rest of the electronic circuitry. The DC voltage E at terminal 36 can be supplied by a battery and either a DC power generator or an AC power generator followed by a full wave rectifier.

Block 601 comprises a switch 700 which controls the light signal of the conventional running taillight 200 of a vehicle, which is also shown in the compartmental assembly of FIG. 6.

Block 602 comprises a polarity switch 701, shown as a double-pole double-throw switch, responsive to the direction of motion of the vehicle. A preferred embodiment of switch 701 has been described in connection with FIG. 4. Switch 701 controls passage of the signal from sensor 60 (see block 603) to the rest of the signal processing circuitry and controls the backup light signal 202, also shown in the compartmental assembly of FIG. 6. Block 602 also comprises a switch 703 which controls, independently, the backup light 202 and is manually operated by the vehicle speed shift mechanism.

Block 603 comprises a small DC generator sensor 60 driven by a shaft turning at a fixed ratio to the drive shaft to the vehicle wheels, such as the speedometer cable takeoff. Sensor 60 produces an electrical DC signal output which is substantially proportional to the angular velocity of the input. Block 603 also contains a signal conditioner circuit including a variable resistor 261 and a capacitor 61 which form a low-pass filter for the electrical signal output of the sensor 60. The polarity switch 701, described in connection with block 602, ensures that only signals corresponding to the forward motion of the vehicle are passed through to the rest of the circuitry. In addition to the polarity switch 701, the diode 62 only allows passage of signals above a minimum magnitude.

The circuitry in block 604 represents an amplifier comprising resistors 116, 117, and 118 and an NPN-transistor 119. It also includes an LRC-type filter formed by an inductor 350, a resistor 352 and a capacitor 351. In block 604, the signal from block 603 is amplified and then smoothed by the filter.

The circuitry of block 606 represents a signal differentiator connected to a single stage amplifier and a meter. The RC-type signal differentiator formed by the capacitor 122 and the resistor 121 is connected through a coupling capacitor 128 to an amplifier comprising resistors 129, 130, 131, and 132 and an NPN-transistor 135. The output from the amplifier is measured by a microammeter 127 (corresponding to block 18 in FIG. 2), biased to a zero center position by the resistors 133 and 134. The meter 127 is protected against overloading by two diodes 125 and 126. The circuitry of block 606 processes the signal from terminal 310 (in block 604), which is substantially proportional to the angular velocity of the input shaft to the sensor 60 (in block 603) and thus to the velocity of forward motion of the vehicle. This input signal is differentiated, amplified, and then finally read on the meter 127. The meter reading will correspond to a first time derivative of the original input signal, that is, the angular acceleration or deceleration of the input shaft to the sensor, which corresponds to the acceleration or deceleration of the vehicle.

The circuits in blocks 607 and 608 are identical to each other except for the diodes 413 and 313. Therefore, a detailed description of the circuitry is only given for block 608. The circuit represents a polarity control a signal differentiator connected to a single stage amplifier. The RC-type differentiator is formed by a capacitor 311 and the resistor 312, which is connected through a decoupling resistor 330 to the amplifier comprising the resistors 316, 317, 319, and an NPN-transistor 320. The input signal for the circuits of blocks 608 and 607 is that of terminal 310 (in block 604), which is also the input signal for the circuit in block 606. The diode 413, shunting resistor 312 of the RC circuit, allows only input signals increasing with time to be processed by the circuit in block 608, while diode 313, shunting the corresponding resistor in the block 607, allows only input signals decreasing with time to be processed by the circuit in block 607. Therefore, differentiated and amplified signals indicating only acceleration of the vehicle will appear at terminal 331 in block 608, and signals indicating only deceleration of the vehicle will appear at terminal 332 in block 607.

The circuit in blocks 609, 610, 611 and 612 are identical to each other except for the values of the components and for switch 333 in block 609 which does not appear in the other blocks. Therefore, a detailed description of the circuitry is only given for block 609. The circuit represents a level sensor and switch which activate light signals. The level sensing circuit is formed by the decoupling resistor 334 and by resistors 137, 138, 139, 140, and a current-amplifying NPN-transistor 240. The coil of a relay 142 is connected on the collector side of the transistor 240 which acts as a current valve for the relay. The relay circuit includes a capacitor 451 and two lamps 201a and 184. Lamp 201a corresponds to the first filament of the double filament lamp in stop light 201 shown in the compartmental assembly of FIG. 6. Lamp 184 corresponds to a miniature lamp on the scale plate of the meter shown in FIG. 5. These two lamps can also be independently controlled by a switch 333, manually operated by the vehicle brake mechanism. The input signal for the circuits of blocks 609 and 610 is that of terminal 332 (in block 607) which corresponds to deceleration of the vehicle. The level sensing and switching circuit of block 609 controls the switching of lamps 201a and 184 at a given threshold value of the deceleration input signal while the circuit of block 610 controls the switching of lamps 201b and 183 at a greater threshold value of the deceleration input signal. Lamp 201b corresponds to the second filament of the double filament lamp in stoplight 201 shown in FIG. 6. Lamp 183 corresponds to a miniature lamp on the scaleplate of the meter in FIG. 5.

In input signal for the circuits of blocks 611 and 612 is that of terminal 331 (in block 608) which corresponds to acceleration of the vehicle. Similarly to blocks 609 and 610, the circuits in blocks 611 and 612 operate, respectively, at a first and a second (greater) threshold value of the acceleration input signal, respectively. The circuit of block 611 controls the switching of lamps 204a and 185, and that of block 612 controls the switching of lamps 204b and 186. Lamp 204a corresponds to the first filament and lamp 204b to the second filament of the double filament acceleration indicating lamp 204 in the compartmental assembly of FIG. 6. Lamps 185 and 186 correspond to miniature lamps on the scale plate of the meter shown in FIG. 5.

Having thus described all components and their functions in a preferred embodiment of this invention, a description will be given next of the operation of this device when installed in a vehicle.

Referring to the schematic diagram of FIG. 7, the device becomes fully operational when a voltage E is applied to the terminal 36 in block 600. With the vehicle stationary, out of gear, and with no brakes applied, switch 701 in block 602 connects the sensor 60 in block 603 to the rest of the signal processing circuitry. However, since no signal is generated by the sensor 60, the indicating needle on the meter 127 in block 606 remains centered at zero, the indicating lights on the meter scale plate remain off and no vehicle rear light signals are given. As the vehicle starts its forward motion and accelerates, a signal is generated by the sensor 60 and if it is large enough to pass the diode 62 in block 603, it is amplified and smoothed out by the circuit in block 604. The signal from terminal 310 is then differentiated and amplified in the circuit of block 606 and a continuous indication of the vehicle acceleration is given by the needle of meter 127. The signal from terminal 310 is also applied to the circuits in blocks 608 and 607. Since the vehicle is accelerating, the magnitude of the signal at terminal 310 is increasing with time and, since the position of diode 313 in the circuit of block 607 prevents the processing of such signals, the signal is differentiated and then amplified only in the circuit of block 608. The resulting signal at terminal 331 is applied to the circuits of blocks 611 and 612. If the base current of the transistor 334 in block 611 reaches its threshold value, the transistor is turned on and the relay 335 becomes energized, switching on the acceleration indicating lamp 204a (first filament of a double filament lamp) of the vehicle and the corresponding miniature lamp 185 on the scale plate of the meter 127. If the signal at terminal 331 is strong enough, transistor 336 in block 612 is also turned on and the relay 337 becomes energized switching on the acceleration indicating lamp 204b (second filament of a double filament lamp) at the rear of the vehicle and the corresponding miniature lamp 186 on the scale plate of the meter 127. As the vehicle reduces its acceleration towards a constant speed, the magnitude of the signal at terminal 331 is gradually reduced. This first causes the base current of transistor 336 to fall below its threshold value, turning off the collector current through it, deenergizing the relay 337 and switching off lamps 204b and 186, and then as the base current of transistor 334 falls below its threshold value, the sequence is repeated with relay 335 and lamps 204a and 185.

As the vehicle travels forward at a constant speed, the signal at terminal 310 is also constant, and when differentiated in the circuit of block 606 it results in a zero signal which appears as a zero acceleration reading on the meter 127. The same constant signal from terminal 310 applied to the differentiating circuits of blocks 608 and 607 results in zero signals from them. Therefore the circuits in blocks 609, 610, 611 and 612 will not be activated and all indicating lamps in these blocks will remain off.

As the vehicle decelerates, starting from a constant forward speed, the signal at terminal 310 is differentiated and amplified in the circuit of block 606 and a continuous indication of the vehicle deceleration is given by the needle of meter 127. The signal from terminal 310 applied to the circuits in blocks 608 and 607 is differentiated and amplified only in the circuit of block 607 which processes signals decreasing with time as occur during a deceleration of the vehicle. The resulting signal at terminal 332 is applied to the circuits of blocks 609 and 610. If the base currents of the transistor 240 in block 609 reaches a threshold value, the transistor is turned on and the relay 142 becomes energized switching on the deceleration indicating lamp 201a (first filament of a double filament lamp) at the rear of the vehicle and the corresponding miniature lamp 184 on the scale plate of meter 127. If the signal at terminal 332 is strong enough, transistor 338 in block 610 is also turned on and the relay 339 becomes energized switching on the deceleration indicating lamp 201b (second filament of a double filament lamp) at the rear of the vehicle and the corresponding miniature lamp 183 on the scale plate of the meter 127. As the vehicle reduces its deceleration towards a constant speed, the magnitude of the signal (in absolute value) at terminal 332 is gradually reduced. This first causes the base current of transistor 338 to fall below its threshold value, turning off the collector current through it, deenergizing the relay 339 and switching off lamps 201b and 183, and then as the base current of transistor 240 falls below its threshold value, the sequence is repeated with relay 142 and lamps 201a and 184.

When the vehicle moves in reverse starting from a stopped position, switch 701 in block 602 disconnects the sensor 60 in block 603 from the rest of the signal processing circuitry and turns on the backup light signal corresponding to the lamp 202 in block 602. When the vehicle stops after its reversing motion, switch 701 turns off lamp 202 and reconnects sensor 60 to the rest of the circuitry. Switch 33 (in block 609) operated by the vehicle brake mechanism, switch 703 (in block 602) operated by the speed shift mechanism, and switch 700 (in block 601) operated by the vehicle lighting switch, can control the first level of deceleration light signal corresponding to lamps 201a and 184 (in block 609), the backup light signal corresponding to lamp 202 (in block 602), and the rear running light signal corresponding to lamp 200 (in block 601), respectively, quite independently from the automatic sensing and indicating system of the vehicle.

Having thus described in detail the components and the operation of a complete preferred embodiment of this invention, a simplified version of this embodiment, adapted to be installed in existing vehicles without major modifications to the vehicle, will be described.

Based on the complete schematic representation of FIG. 7, such a simplified version would comprise blocks 600, 601, 602, 603, 604, 607 and 609. The removal of switch 701 in block 602 would be a further possible simplification. The device would make use only of the conventional external light signals of a vehicle, that is, stoplights and backup lights. Its functions would be limited to (1) activating the rear stop lights of a vehicle at a given level of deceleration, independently from the operation of the vehicle brakes, and (2) activating the backup lights of the vehicle independently from the operation of the speed shift mechanism.

Components for alternative embodiments of this invention are disclosed next. Descriptions are given making reference to modules corresponding to some of the blocks shown in FIG. 7. Replacement modules for the DC generator sensor and signal conditioner circuit of block 603 in FIG. 7 comprise (1) an AC generator sensor as shown in FIG. 8, (2) a magnetic rotor sensor as shown in FIG. 9, and (3) a light beam interrupting sensor as shown in FIG. 10, each with its signal conditioner circuit.

The sensor itself can be driven by any of various ramifications of the drive shaft to the vehicle wheels. Typical installations would consist of (1) a sensor driven directly or through coupling elements by the speedometer cable or the transmission drive to it, and (2) a sensor driven through coupling elements by the drive shaft to the vehicle wheels.

In FIG. 8 a small AC generator sensor 65 is driven by a shaft turning at a fixed ratio to the drive shaft to the vehicle wheels. The AC output of the generator 65 is rectified by a full wave rectifier 66, and the signal is further smoothed by a capacitor 67 before reaching terminals 68 and 305.

In FIG. 9, an even number of magnets 70 mounted on a rotor 71 are driven by a shaft turning at a fixed ratio to the drive shaft to the vehicle wheels. Each time the pole of a magnet 70 passes in front of the coil 72, a sharp electric pulse is induced in the coil 72. The magnets 70 are arranged on the periphery of the rotor 71 so that a north pole is followed by a south pole, and a south pole by a north pole, inducing positive and negative pulses, respectively, in the coil 72. These pulses are then clipped to the required level by the combination of the diodes 73 and 74 and the resistors 75 and 76. The signal then passes through the coupling capacitor 77 to drive a monostable multivibrator circuit formed by the resistors 78, 79, 80, 81, 82, 83, 84, and 85, the capacitor 86 and the NPN-transistors 87 and 88. The multivibrator circuit, so driven, generates a constant amplitude square wave AC signal at terminal 89, said AC signal having a repetition rate or frequency proportional to the angular velocity of the rotor 71. This AC signal then passes through a signal conditioner, comprising the variable resistor 90 and the capacitor 91, into a full wave rectifier 92 which has a capacitor 93 across its output for signal smoothing purposes. The DC output signal between the terminals 94 and 305 is then a function of the angular velocity of the rotor 71. In FIG. 9, the monostable multivibrator circuit could be replaced by a bistable multivibrator, a Schmitt trigger circuit, an amplifier and a filter, or a combination of these, in order to generate the AC signal which is subsequently rectified.

In FIG. 10, a disc 95 is driven by a shaft turning at a fixed ratio to the drive shaft to the vehicle wheels. The disc 95 has preferably an even number of slots cut into its periphery which permit the passage of a beam of light from the lamp 96. As the disc 95 rotates, an electric pulse is generated in the phototransistor 98 each time a slot in the disc 95 allows the exposure of the phototransistor 98 to the beam of light from the lamp 96. The phototransistor 98 therefore works at two stable current levels, corresponding to its dark and its illuminated conditions. The amplifier incorporating the phototransistor 98, and the resistors 100, 101 and 102, produces a signal at the terminal 99 consisting of a train of constant amplitude pulses at a repetition rate or frequency which varies in accordance with the angular velocity of the disc 95. This signal is passed through the coupling capacitor 103 into the amplifier comprising resistors 104, 105, 106 and 107 and the NPN-transistor 108 to generate a constant amplitude AC signal at the frequency of said pulses. The output of the amplifier is passed through the signal conditioner formed by the variable resistor 109 and the capacitor 110 into a full wave rectifier 111 which has an output smoothing capacitor 112. The DC signal between terminals 113 and 305 is then a function of the angular velocity of the disc 95.

Some typical replacement modules for the level sensor and switch of blocks 609, 610, 611 and 612 in FIG. 7 make use of (1) a transistor and two relays, (2) a power transistor, (3) a modified Schmitt trigger incorporating a power transistor, (4) a modified Schmitt trigger incorporating a relay, (5) a monostable multivibrator circuit, (6) a glass semiconductor threshold switch, and (7) an SCR (silicon controlled rectifier). Typical such level sensor and switching modules are shown in FIG. 11 through 17.

The circuit of FIG. 11 uses a glass semiconductor threshold switch 801. Such a switch is a two-terminal device in which an input signal at a threshold level and above causes conduction of the signal between the two terminals as a result of a bulk semiconductor effect. Thus the level sensing and switching functions are performed by a single circuit component. The symbol used for the glass semiconductor threshold switch 801 is used throughout the drawing to represent an element having the properties just described. In addition, such glass semiconductor switches can be made to exhibit polarity sensitivity, a property which is utilized in the circuits of FIGS. 18 and 19 to be described subsequently. Suitable such glass semiconductor threshold switches are sold under the name "Ovonic" by Energy Conversion Devices, Inc. of Troy, Mich.

The circuit of FIG. 11 can replace each of the circuits of blocks 609, 610, 611 and 612 in FIG. 7. The input signal is applied between the terminals 136 and 305. The switch 801 acts as a threshold switch and current valve controlling the operation of relay 142, which switches lamps 201a and 184. In this circuit, when the voltage at terminal 136 reaches the threshold value, the switch 801 is turned on and the relay 142 becomes energized closing the circuit of lamps 201a and 184. When the voltage at terminal 136 falls below another threshold value, the switch 801 opens and the relay 142 is also deenergized, opening the circuit of lamps 201a and 184. The circuit may also include an output smoothing capacitor 451.

The circuit of FIG. 12 is similar to that of blocks 609, 610, 611 and 612 in FIG. 7. It can replace the circuits of two blocks acting on signals of one polarity at two different levels, like blocks 609, 610, or blocks 611 and 612. The input signal is applied between the terminals 136 and 305. Resistors 137, 138, 139 and 140, together with the transistor 240, comprise a circuit used to control the switching of the lamps 201a, 184 and 201b, 183. In this circuit two independent relays 142 and 442 are used, with relay 142 requiring a larger threshold activation current than relay 442. When the base current of the transistor 240 reaches a threshold value, the transistor is turned on, and the relay 442 becomes energized closing the circuit of lamps 201a and 184. As the base current of the transistor 240 exceeds the first threshold value and reaches a second threshold value, the collector current through the transistor also increases proportionately, becoming large enough to energize the relay 142 in addition to relay 442, switching on lamps 201b and 183 as well. When the base current of the transistor 240 falls below the second threshold value, the relay 142 is deenergized, opening the circuit of the lamps 201b and 183, and when the base current falls below the first threshold value, the collector current through the transistor 240 is turned off and the relay 442 is also deenergized opening the circuit of the lamps 201a and 184. This circuit also includes smoothing capacitors 451 and 551.

FIG. 12a illustrates a modification of the circuit of FIG. 12 in which the circuitry to the left of terminals A and B is replaced so that terminal A is directly connected to terminal 305, and a glass semiconductor threshold switch 801 is connected between terminals 136 and B. The circuit operates, as previously described, with the switch 801 acting as a threshold switch and controlling the switching of relays 442 and 142.

In FIG. 13 the input signal is applied between the terminals 136 and 305. This circuit, which includes the resistors 137, 138 and 139, and an NPN-power-transistor 240, is used to control the switching of the lamps 201a and 184. When a threshold value of the transistor base current is reached, the transistor 240 is turned on and current passes through the lamps. When the base current of the transistor 240 falls below the threshold value, the transistor 240 is turned off and the lamps are extinguished. Since the current through the lamps 201a and 184 is also the collector current of the transistor 240, the transistor 240 must be capable of carrying relatively large currents.

In the circuits of FIG. 14, use of glass semiconductor threshold switches 954 and 955 can replace the circuits of two blocks acting on signals of one polarity at two different levels, like blocks 609 and 610, or 611 and 612 in FIG. 7. The input signal is applied between the terminals 136 and 305. The circuit formed by resistors 950, 951 and 952, and the NPN-transistor 953 functions as a voltage amplifier. When the voltage at point 956 reaches a first threshold value, the switch 954 is turned on, closing the circuit of lamps 201a and 184. As the voltage at point 956 exceeds the first threshold value and reaches a second threshold value, the parallel switch 955 is turned on, closing the circuit of lamps 201b and 183 as well. When the voltage at point 956 falls below another second and then another first threshold value, the switch 955 and then the switch 954 will be turned off, opening the circuits of lamps 201b and 183, and then 201a and 184, respectively. Since the current through lamps 201a and 184, and the lamps 201b and 183 is also the collector current of the transistor 953, this transistor must be capable of carrying relatively large currents.

In FIG. 15, the input signal is applied between the terminals 136 and 305. This is a trigger circuit comprising resistors 455, 456, 457, 458 and 459, a capacitor 460, NPN-transistors 461, and NPN-power-transistor 462, with lamps 201a and 184 connected to the collector of the transistor 462. When the input signal at the terminal 136 is below a threshold value, the branch of the trigger circuit comprising transistor 461 conducts while the branch of the trigger circuit comprising transistor 462 remains off and functions as a current valve this operating mode is also attained when a feedback loop is connected between the emitter of transistor 462 and the base of transistor 461. As the input signal at the terminal 136 reaches, and exceeds, the threshold value, the transistor 461 is turned off and the transistor 462 is switched on allowing current to pass through the collector side of the transistor 462, thus energizing the lamps. The transistor 462 must be capable of carrying the currents required by lamps 201a and 184.

FIG. 15a illustrates a modification of the circuit of FIG. 15 in which the coil of a relay 142 replaces lamps 184 and 201a between terminals A and B. The alternate circuit also includes capacitor 451. With relay 142 in place, the current passing through current valve transistor 462 can be much less than in the circuit of FIG. 15. The circuit operates as before with relay 142 switching when the transistor 462 does.

FIG. 15b illustrates a modification of the circuit of FIG. 15 in which lamps 184 and 201a between terminals A and B are removed, the terminals are shorted, and a glass semiconductor switch 800 followed by lamps 184 and 201a is connected to terminal A (or B). The switch 800 reduces the current carrying requirements for transistor 462. It is to be noted that the switch 800 operates when the transistor 462 is switched on.

In FIG. 16 the input signal is applied between the terminals 136 and 305. The circuit, comprising the resistors 146, 147, 148, 149, 150, 151, 152, 153 and 154, the capacitor 155 and the NPN-transistors 157 and 158, is a monostable multivibrator circuit, acting as a current valve, which can be destablizied by an input signal above a given threshold value, returning automatically to its stable condition after a short predetermined period of time. During the destabilized period of the circuit, a current passes through the coil of the relay 142 which becomes energized and closes the circuit of lamps 201a and 184 which includes the capacitor 451. When the multivibrator circuit returns to its stable state, the relay 142 becomes deenergized and the lamps are turned off. However, when an input signal above the threshold value is still present at the terminal 136 at the time the circuit returns to its stable state, the circuit becomes immediately destabilized again. The speed of response of the circuit is determined by the destabilization time period. The frequent switching of the relay while an input signal above threshold exists may be eliminated by a large value capacitor 156 connected across the coil of the relay 142 and/or a highly damped relay mechanism in the relay 142 itself.

FIG. 16a illustrates a modification of the circuit of FIG. 16 in which the circuitry to the right of terminals A and B is replaced by a glass semiconductor threshold switch 800 connected to terminal A and followed by lamps 184 and 201a. Switch 800 is activated under the same conditions as the relay 142 in FIG. 16 whereby the circuit operates in the same manner as the circuit of FIG. 16.

The circuit in FIG. 17 is best adapted to vehicles having an AC power generator giving an AC voltage "e." In this circuit the input signal is applied between the terminals 136 and 305. The circuit, comprising an SCR (silicon controlled rectifier) 143, a capacitor 450 to block the leakage current through the SCR, and a resistor 144, controls the switching of lamps 201a and 184. When a threshold value of the signal current to the gate of the SCR 143 is reached and exceeded, the SCR 143 is turned on and current from the AC power source passes through the lamps. The SCR 143 is turned off when the signal current to the gate of the SCR 143 falls below the threshold value, and the next negative half cycle of the AC voltage "e" appears at the anode of the SCR 143.

The circuit in FIG. 18 can replace those of blocks 607, 608, 609 and 611 in FIG. 7. This circuit can perform the functions of a signal differentiator, polarity control, level sensor, and switch. The input signal, applied between terminals 310 and 305, corresponds to the amplified DC signal from a sensor, such as obtained through the circuits of blocks 603 and 604 in FIG. 7. Resistor 960 and capacitor 961 form an RC-type differentiator which processes both signals increasing with time and decreasing with time. Therefore, differentiated signals corresponding to both acceleration and deceleration of the vehicle will appear at terminal 962. Glass semiconductor threshold switches 954 and 970, of opposite polarity response and connected in parallel, act as polarity controls, level sensors, and switches. While both switches are designed for relatively high currents, low threshold and small breakback voltage, switch 954 operates only for signals corresponding to deceleration, and switch 970 only for signals corresponding to acceleration. In this circuit, when the voltage at terminal 962 reaches a threshold value for deceleration, the switch 954 is turned on, closing the circuit of lamps 201a and 184, while the switch 970 remains off. DC power to energize the lamps is obtained from $V_{cc}$ applied across resistor 991. When the voltage at terminal 962 falls below another threshold value, the switch 954 is turned off, opening the circuit of lamps 201a and 184. As the voltage at terminal 962 reaches a "turn on" and then another "turn off" threshold value for acceleration, the same process occurs with switch 970 and lamps 204a and 185. In order to obtain signalling at second levels of deceleration and acceleration, as is done by the circuits of blocks 610 and 612 in FIG. 7, it would be sufficient to include additional groups of the appropriate switches and signalling lamps.

The circuit in FIG. 19 can replace those of blocks 604, 607, 608, 609, and 611 in FIG. 7. This circuit can perform the functions of a signal differentiator, polarity control, level sensor, and switch. The input signal, applied between terminals 990 and 305 corresponds to the DC signal from a sensor, such as obtained between terminal 305 and the point following diode 62 in block 603 of FIG. 7. Resistor 960 and capacitor 961 form an RC-type differentiator which processes both signals increasing with time and decreasing with time. Therefore, differentiated signals corresponding to both acceleration and deceleration of the vehicle will appear at terminal 962. As in the circuit of FIG. 18, glass semiconductor threshold switches 954 and 970, of opposite polarity response and connected in parallel, act as polarity controls, level sensors, and switches, and while switch 954 operates only for signals corresponding to deceleration, switch 970 operates only for signals corresponding to acceleration. In this circuit, when the voltage at terminal 962 reaches a threshold value for deceleration, switch 954 is turned on, while switch 973 remains off. When switch 954 is on, current can pass to the gate of the SCR 143 to turn it on, thereby closing the circuit from the AC power supply (of voltage "e") through resistor 144 to the lamps 201a and 184. When the voltage at terminal 962 falls below another threshold value, the switch 954 is turned off, thereby cutting the signal to the gate of the SCR 143, so that when the next negative half cycle of the AC voltage "e" appears at the anode of the SCR 143, this is turned off as well. As the voltage at terminal 962 reaches a "turn on" and then another "turn off" threshold value for acceleration, the same process occurs with the circuit branch formed by switch 970, resistor 975, and SCR 978 and lamps 204a and 185. In this circuit, to obtain signalling at second levels of deceleration and acceleration, as is done by the circuits of blocks 610 and 612 in FIG. 7, additional groups of appropriate glass semiconductor threshold switches, SCR's, and signalling lamps, can be used.

FIG. 20 illustrates a replacement module for the signal differentiator connected to a single stage amplifier, and the meter of block 606 in FIG. 7, which replacement module comprises a signal differentiator and a galvanometer. In the circuit of FIG. 20, the input signal is applied to an RC-type circuit consisting of a resistor 121 and a capacitor 122. This circuit produces a time derivative signal of the input, at the terminal 123, which is then measured by a galvanometer 124, protected against exceedingly strong currents by the diodes 125 and 126.

The circuits described in connection with the blocks of FIG. 7 can be interchangeably used with the corresponding circuits described in relation to FIGS. 8 through 20 in any combination resulting in the performance of the described functions, including combinations in which certain functions are eliminated. Any of the circuits embodying NPN- or PNP-transistors could also be adapted to operate with field effect transistors.

In the specific embodiments described in this specification the sensor and signal conditioner module 603 (FIG. 7), and the various replacement modules therefor, produced a DC signal of a magnitude representative of the speed of the vehicle. However, the general principles of this invention are applicable also to systems in which the sensor and signal conditioner module produces a pulse or AC signal of a frequency representative of the speed of the vehicle. Specific embodiments utilizing such an AC signal are disclosed and claimed in our copending application Docket No. KL-103, filed concurrently herewith. It should further be noted that the sensors in the replacement modules of FIGS. 9 and 10 both generate such a pulse signal which is then conditioned and rectified to provide a DC signal; thus it is apparent that the sensors and signal conditioners in these replacement modules may be used without their respective rectifiers in the systems of said copending application.

While several forms of this invention have been disclosed, it is understood that this more detailed description is given by way of illustration and explanation only and not by way of limitation, since various changes therein may be made by those skilled in the art without departing from the scope and spirit of this invention.

Having thus described the invention, what is claimed is:

1. A system for automatically sensing and indicating the deceleration or acceleration of a vehicle, comprising: means for generating a first signal representative of the speed of said vehicle; first means of differentiation with respect to time, differentiating said first signal, for generating a second signal only upon an increase in said first signal with time, whereby said second signal is indicative of the acceleration of said vehicle; second means of differentiation with respect to time, differentiating said first signal, for generating a third signal only upon a decrease in said first signal with time, whereby said third signal is indicative of the deceleration of said vehicle; first level sensing and switching means responsive to said second signal for actuating indicator means for at least one discrete level of acceleration of said vehicle; and said second level sensing and switching means responsive to said third signal for actuating indicator means for at least one discrete level of deceleration of said vehicle.

2. A system according to claim 1, further comprising: third means of differentiation with respect to time, differentiating said first signal, for generating a fourth signal upon either an increase or a decrease in said first signal with time; and means responsive to said fourth signal for providing a continuous reading of the acceleration or deceleration of said vehicle.

3. A system according to claim 2 wherein said continuous reading means comprises a current amplifier driven by said fourth signal, and an ammeter, biased to a zero center position, for measuring the output of said amplifier.

4. A system according to claim 2 wherein said continuous reading means comprises a galvanometer responsive to said fourth signal.

5. A system according to claim 1 wherein said first means of differentiation comprises an RC circuit in which the signal corresponding to acceleration is developed across a resistor connected in shunt with a diode arranged with a polarity for blocking signals decreasing in magnitude with time, and said second means of differentiation comprises an RC circuit in which the signal corresponding to deceleration is developed across a resistor connected in shunt with a diode arranged with a polarity, opposite to said first-named polarity, for blocking signals increasing in magnitude with time.

6. Apparatus for automatically indicating a level of deceleration of a vehicle which exceeds a given threshold of deceleration, comprising: means for separately developing a signal representative of the deceleration of a vehicle; a relay including a relay coil; combined level sensing and switching means incorporating semiconductor means, said combined means being responsive to a deceleration input signal and, said switching means turning on when said input signal reaches a threshold level of deceleration to permit current flow through said relay coil, said relay coil being connected in series with said switching means for actuating said relay and; an indicator responsive to the actuation of said relay, said deceleration signal being applied as an input to said level sensing and switching means whereby said relay is actuated only when said signal reaches and exceeds said threshold input signal level.

7. Apparatus according to claim 6 wherein said combined level sensing and switching means comprises a current amplifier biased for substantial cut off in the absence of an input signal of a level exceeding said threshold signal level, and said relay coil is connected in series with the output of said switching means.

8. Apparatus according to claim 6 wherein said combined level sensing and switching means comprises a two-branch trigger circuit including a first branch wherein a first transistor conducts substantially only when the input signal level is smaller than said threshold signal level and a second branch wherein a second transistor conducts substantially only when the input signal level is larger than said threshold signal, and said relay coil is connected in series with said second branch.

9. Apparatus according to claim 6 wherein said combined level sensing and switching means comprises a monostable multivibrator circuit which is destabilized by an input signal of a level equal to or greater than said threshold signal level to thereby generate a destabilization current, and said relay coil is connected in series with said destabilization current.

10. Apparatus for automatically indicating a level of deceleration of a vehicle, when said vehicle exceeds a given threshold of deceleration, comprising: means for separately developing a signal representative of the deceleration of a vehicle; combined electronic level sensing and switching means incorporating semiconductor means, said combined means being responsive to a deceleration input signal, said switching means turning on when said input signal reaches a threshold level of deceleration; and an indicator in series with said switching means, said deceleration signal being the input of said level sensing and switching means whereby said switching means turns on and passes substantial current directly through said indicator only when said signal reaches and exceeds said threshold input signal level.

11. Apparatus according to claim 10 wherein said combined electronic level sensing and switching means comprises a current amplifier biased for substantial cut off in the absence of an input signal of a level exceeding said threshold signal level, and said indicator is connected in series with the output of said current amplifier.

12. Apparatus according to claim 10 wherein said combined electronic level sensing and switching means comprises a two-branch trigger circuit including a first branch wherein a first transistor conducts substantially only when the input signal level is smaller than said threshold signal level and a second branch wherein a second transistor conducts substantially only when the input signal level is larger than said threshold signal level, and said indicator is connected directly to said second branch.

13. A system for automatically indicating at least two levels of deceleration of a vehicle, comprising: means for separately developing a signal representative of the deceleration of a vehicle; and first means for actuating a first indicator when said signal exceeds a first threshold value and separate second means for actuating a second indicator when said signal exceeds a second threshold value, greater than said first threshold value, said first actuating means comprising a combined first level sensing and switching means incorporating semiconductor means, said first combined means being operatively associated with said indicator, which is actuated when said signal exceeds said first threshold value thereby turning on said first level switching means, and said second actuating means comprising a combined second level sensing and switching means incorporating semiconductor means, said second combined means being operatively associated with said second indicator, which is actuated when said signal exceeds said second threshold value thereby turning on said second level switching means.

14. A system according to claim 13 wherein said first level sensing and switching means comprises a first current amplifier to which said deceleration input signal is applied, said first amplifier being biased for substantial cutoff in the absence of an input signal exceeding said first threshold value, said first level sensing and switching means further comprises a first relay having a coil in series with said first current amplifier, said first relay being activated by the output current of said first amplifier whenever said first current amplifier is caused to conduct by an input signal which is substantially at or beyond said first threshold value; and said second level sensing and switching means comprises a second current amplifier to which said same deceleration signal is applied, said second amplifier being biased for substantial cutoff in the absence of an input signal exceeding said second threshold value, said second level sensing and switching means further comprises a second relay having a coil in series with said second current amplifier said second relay being activated by the output current of said second amplifier whenever said second current amplifier is caused to conduct by an input signal which is substantially at or beyond said second threshold value.

15. A system according to claim 2 wherein said continuous reading means provides a quantitative indication of the magnitude of the acceleration or deceleration of said vehicle, and further comprises interior visual display means responsive to said fourth signal for the direct and continuous reading of acceleration or deceleration.

16. A system according to claim 13 wherein said first level sensing and switching means includes a first two-branch trigger circuit to which said acceleration or deceleration input signal is applied, said first trigger circuit having a first branch which conducts substantially only when the input signal level is smaller than said first threshold value and a second branch which conducts substantially only when the input signal level is larger than said first threshold value, said first level sensing and switching means further having a first relay having a coil in series with said second branch, said first relay being activated by the current in the second branch of said first two-branch trigger circuit whenever said second branch is caused to conduct by an input signal which is substantially at or beyond said first threshold value; and, said second level sensing and switching means including a second two-branch trigger circuit to which said same acceleration or deceleration signal is applied, said second trigger circuit having a third branch which conducts substantially only when the input signal level is smaller than said second threshold value and a fourth branch which conducts substantially only when the input signal level is larger than said second threshold value, said second level sensing and switching means further having a second relay having a coil in series with said fourth branch, said second relay being activated by the current in the fourth branch of said second two-branch trigger circuit whenever said fourth branch is caused to conduct by an input signal which is substantially at or beyond said second threshold value.

17. A system according to claim 13 wherein said first level sensing and switching means includes a first monostable multivibrator circuit to which said acceleration or deceleration input signal is applied, said first multivibrator circuit is destabilized substantially only when the input signal level is larger than said first threshold value, said first level sensing and switching means further including a first relay having a coil in series with the branch of said multivibrator which carries a first destabilization current whenever the multivibrator becomes destabilized, said first relay being activated by said first destabilization current of said first monostable multivibrator circuit whenever said first current is caused to appear by an input signal which is substantially at or beyond said first threshold value; and, said second level sensing and switching means includes a second monostable multivibrator circuit to which said same acceleration or deceleration input signal is applied, said second multivibrator circuit is destabilized substantially only when the input signal level is larger than said second threshold value, said second level sensing and switching means further including a second relay having a coil in series with the branch of said second multivibrator which carries a second destabilization current whenever the multivibrator becomes destabilized, said second relay being activated by said second destabilization current of said second monostable multivibrator circuit whenever said second current is caused to appear by an input signal which is substantially at or beyond said second threshold value.

18. Apparatus for automatically indicating a level of acceleration of a vehicle which exceeds a given threshold of acceleration, comprising: means for separately developing a signal representative of the acceleration of a vehicle; a relay including a relay coil; combined level sensing and switching means incorporating semiconductor means, said combined means being responsive to an acceleration input signal and, said switching means turning on when said input signal reaches a threshold level of acceleration to permit current flow through said relay coil, said relay coil being connected in series with said switching means for actuating said relay and; an indicator responsive to the actuation of said relay, said acceleration signal being applied as an input to said level sensing and switching means whereby said relay is actuated only when said signal reaches and exceeds said threshold input signal level.

19. Apparatus for automatically indicating a level of acceleration of a vehicle, when said vehicle exceeds a given threshold of acceleration, comprising means for separately developing a signal representative of the acceleration of a vehicle; combined electronic level sensing and switching means incorporating semiconductor means, said combined means being responsive to an acceleration input signal and, said switching means turning on when said input signal reaches a threshold level of acceleration; and an indicator in series with said switching means, said acceleration signal being the input of said level sensing and switching means whereby said switching means turns on and passes substantial current directly through said indicator only when said signal reaches and exceeds said threshold input signal level.

* * * * *